United States Patent

[11] 3,576,455

[72] Inventor Michael J. Ingenito
　　　　　　　Bronx, N.Y.
[21] Appl. No. 874,280
[22] Filed Nov. 5, 1969
[45] Patented Apr. 27, 1971
[73] Assignee General Time Corporation
　　　　　　　Stamford, Conn.

[54] SYNCHRONOUS RELUCTANCE MOTOR
　　　22 Claims, 20 Drawing Figs.
[52] U.S. Cl. .................................................. 310/163,
　　　310/190, 310/46, 318/138, 58/23
[51] Int. Cl. ....................................................... H02k 19/06
[50] Field of Search ............................................ 310/46,
　　　162, 163, 4, 190; 318/166, 138; 58/23, 33

[56] References Cited
UNITED STATES PATENTS

| | | | |
|---|---|---|---|
| 2,378,556 | 6/1945 | Jeffers ........................... | 310/163 |
| 2,994,023 | 7/1961 | Devol ............................ | 318/138 |
| 3,250,066 | 5/1966 | Engelhardt ..................... | 58/23 |
| 1,466,304 | 8/1923 | Koch ............................. | 310/190 |
| 1,753,331 | 4/1930 | Clokey .......................... | 310/163X |
| 1,998,297 | 4/1935 | Warren ......................... | 310/163 |
| 1,957,281 | 5/1934 | Neureuther ................... | 310/163 |
| 2,034,499 | 3/1936 | Warren ......................... | 310/163 |
| 2,758,206 | 8/1956 | Hamilton ...................... | 250/36 |

Primary Examiner—D. X. Sliney
Attorney—Pennie, Edmonds, Morton, Taylor & Adams

ABSTRACT: A synchronous reluctance motor particularly useful as a clock drive motor. The motor includes a stator having an airgap and a rotor having spaced teeth of magnetic material which travel in a circular path and pass through the airgap of the stator. A magnetic flux is established periodically in the stator airgap in timed relation to an approaching tooth. The timing is such that flux buildup in the airgap occurs when an approaching tooth is closer to the airgap than a receding tooth, and the flux is approximately zero when the tooth is at the center of the airgap. Hence, there is no retarding force on a tooth as it leaves the airgap. The pulsating flux is established, in one embodiment, by a power source which supplies periodic current pulses to the stator winding. In another embodiment, the power source has a sinusoidal wave form, and a magnetic shunt paralleling the stator airgap converts the sinusoid into a series of current pulses for energizing the stator winding.

Patented April 27, 1971

INVENTOR.
MICHAEL INGENITO
BY
Morgan, Finnegan, Durham & Pine
ATTORNEYS

Patented April 27, 1971
3,576,455
2 Sheets-Sheet 2
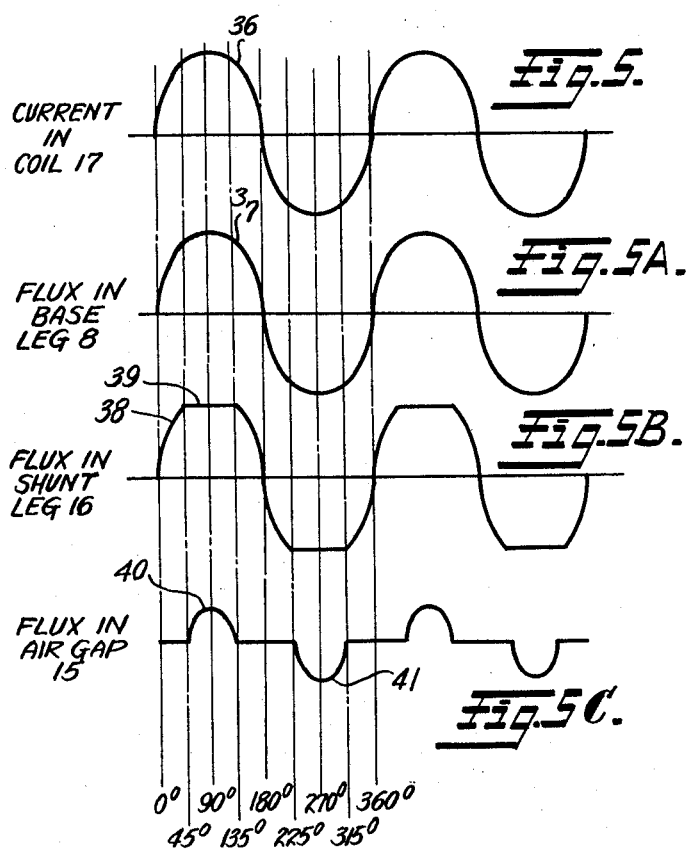
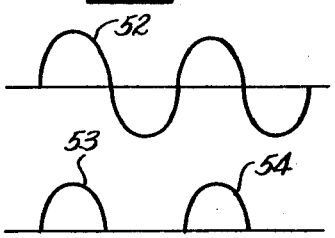
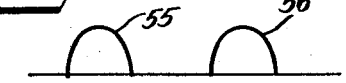
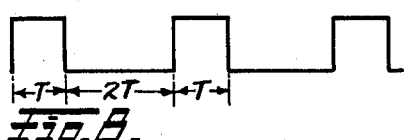
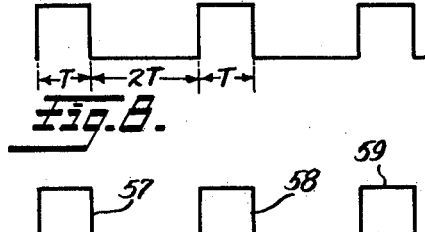
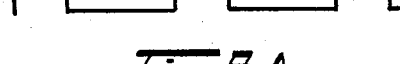
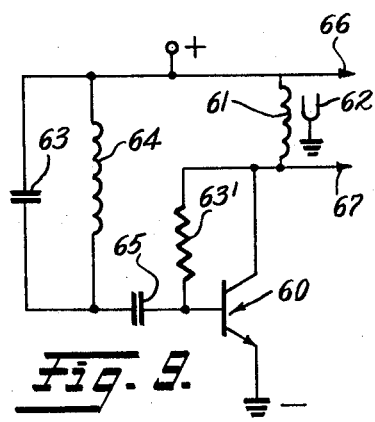
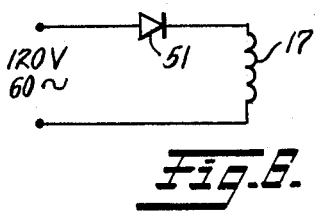
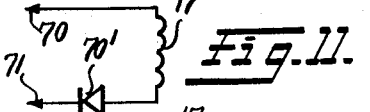
INVENTOR.
MICHAEL INGENITO
BY
Morgan, Finnegan, Durham & Pine
ATTORNEYS

3,576,455

1

SYNCHRONOUS RELUCTANCE MOTOR

BACKGROUND OF THE INVENTION

This invention relates generally to a synchronous reluctance motor system. More specifically, the invention relates to a small synchronous motor system of the type that can be used to drive a clock.

Small synchronous motors are commonly used to drive clocks or other timepieces since they inherently possess a high degree of timing accuracy even though produced very inexpensively.

An object of this invention is to provide a reluctance type synchronous motor which can be produced at an exceptionally low cost.

Another object of the invention is to provide a reluctance motor in which spaced teeth of the rotor travel through the airgap of the stator in which magnetic flux is periodically induced in timed relation to an approaching tooth of the rotor.

Another object is to provide a reluctance motor energized directly from a current source of sinusoidal waveform and in which the magnetic circuit of the motor establishes flux in the stator airgap for only a portion of each half cycle of the energizing current.

Another object is to provide a synchronous reluctance motor which can be efficiently coupled to an energizing source of pulsating current in which the pulses have a selected duty cycle.

A further object is to provide an efficient reluctance synchronous motor in which flux in the stator airgap is established in timed relation to an approaching rotor tooth and in which the flux is substantially decayed when the tooth is centered in the airgap.

A still further object is to provide a small reluctance type synchronous motor having particular utility in clocks and other timepieces, and in which the motor and its power source are of simple inexpensive construction.

BRIEF SUMMARY OF THE INVENTION

In the small synchronous reluctance motor according to the invention, the flux induced in the stator pole of the motor is established periodically. The flux builds up when an approaching rotor tooth is closer to a stator pole then a departing rotor tooth, and decays to zero when the tooth is centered at the stator pole so there is little retarding force on the then departing tooth. This flux induced in the stator pole takes the form of periodic pulses having a selected duty cycle.

In accordance with one embodiment of this invention, the power source for the motor is the usual 60-cycle AC source which has a sinusoidal waveform. The magnetic circuit of the stator is so constructed that during each half cycle of the sinusoid the magnetic flux at the stator pole is present for substantially less than the half cycle. Hence, the flux at the pole occurs periodically in pulselike fashion. Pulsating magnetic flux at the stator pole is obtained from the sine wave current by providing a magnetic shunt in parallel with the stator pole airgap. The shunt is so constructed that when the stator winding is energized from the alternating current source, magnetic flux initially builds up in the shunt rather than the airgap. When the shunt is saturated the flux builds up across the stator pole airgap. The shunt prevents flux buildup at the airgap during the first 45° of an alternating current half wave and causes the decay of the airgap flux 45° before the termination of the alternating current half wave.

In a second embodiment of the motor system of this invention, the power source for the motor provides periodic pulses of current to establish the desired magnetic flux pulses at the stator. In one form of this embodiment of the system, the power source is alternating current. A rectifier diode is connected in series with the alternating current source so that only pulses of half wave rectified current energize the stator winding. In another form of this embodiment, rectangular-shaped pulses are supplied to the stator winding from a tuning fork controlled oscillator.

2

By virtue of applicant's invention, a small low cost synchronous reluctance motor is provided.

BRIEF DESCRIPTION OF THE DRAWINGS

An illustrative embodiment is described in the following detailed specification which includes the drawings and wherein:

FIGS. 5—5c show the relationship between the energizing current to the motor of FIGS. 1—3 and the magnetic flux in various portions of the magnetic circuit of the motor;

FIG. 6 shows a circuit for connecting the motor of FIG. 4 for operation with AC current;

FIGS. 7—7B show the relationship between line current and the flux produced in the motor of FIG. 4 using the circuit of FIG. 6;

FIG. 8 shows rectangular energizing pulses for the motor of FIG. 4;

FIG. 8A shows the flux produced in the stator airgap by the current pulses of FIG. 8;

FIG. 9 is a schematic circuit diagram of a tuning fork oscillator;

FIG. 10 shows one manner of connecting the stator coil of the motor to the oscillator of FIG. 9;

FIG. 11 shows another circuit for connecting the stator coil of the motor to the oscillator of FIG. 9;

FIG. 12 shows another circuit for connecting the stator coil to the oscillator of FIG. 9 to make the motor more efficient;

FIG. 13 shows another circuit for connecting the stator coil of the motor to the oscillator of FIG. 9 to minimize coil interaction; and FIG. 14 shows a somewhat more sophisticated circuit arrangement for connecting the coil of the motor to the oscillator of FIG. 9.

THE MOTOR OF FIGS. 1—3

Figure 1:
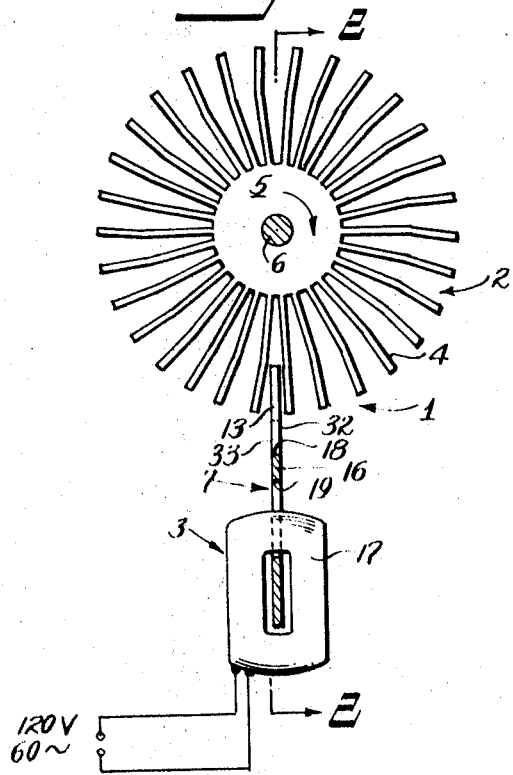
FIG. 1 is a side elevational view, partly in section, showing a first embodiment of the motor system of this invention.
Figure 2:
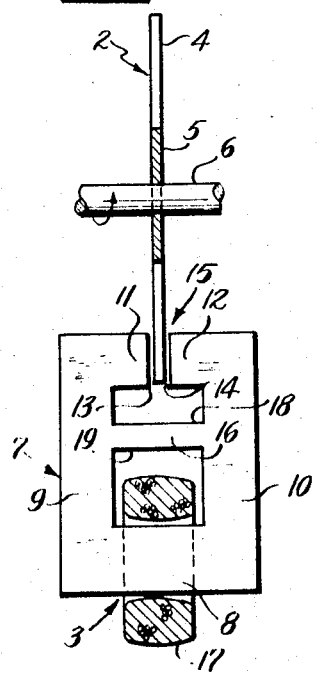
FIG. 2 is a front view in section taken along line 2-2 of FIG. 1.
Figure 3:
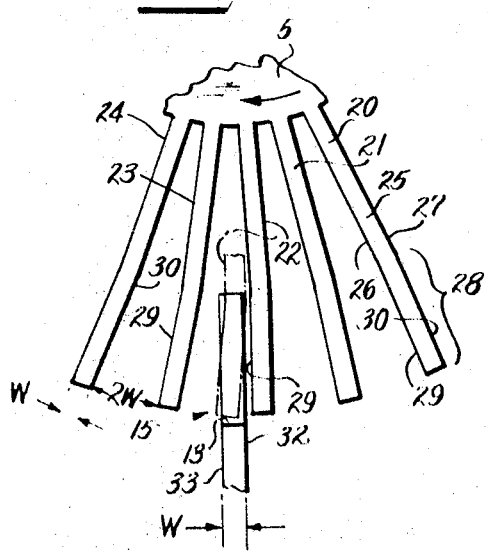
FIG. 3 is an enlarged partial view corresponding to FIG. 1 showing details of the rotor and stator.

Referring now to the drawings in detail and particularly to FIGS. 1—3, there is shown a reluctance synchronous motor 1 in accordance with this invention, having a rotor 2 and a stator assembly 3. Rotor 2 includes a plurality of teeth 4 connected to a hub 5 and projecting radially from the hub. As shown at FIG. 2, teeth 4 all lie in a common plane with hub 5 and are perpendicular to the axis of a shaft 6 to which the hub is secured. Rotor 2 may be formed by stamping out the spaces between teeth from a sheet of magnetic material.

Stator assembly 3 includes a stator 7 formed from a sheet or plate of magnetic material. Stator 7 is generally U-shaped and has a base leg 8, a pair of parallel side legs 9 and 10, and short end legs 11 and 12 projecting inwardly toward each other from the respective legs 9 and 10. The inner ends of legs 11 and 12 respectively present flat, parallel, spaced apart pole faces 13 and 14. The space between pole faces 13 and 14 defines the airgap 15 of stator assembly 3.

Extending between side legs 9 and 10, at a location approximately midway between leg 8 and legs 11 and 12, is a leg 16 which is somewhat narrower than the other legs when viewed in front elevation as at FIG. 2. Leg 16 functions as a magnetic shunt.

Wound on leg 8 of the stator is a coil 17 which creates magnetic flux in the stator when the coil is energized.

As shown in FIG. 1, the several legs of stator 7 are all of the same thickness. However, it will be observed with reference to FIGS. 1 and 2 that the width of shunt leg 16 as measured between edges 18 and 19 is substantially less than the width of legs 8—12 of the stator, and hence the cross-sectional area of leg 16 is substantially less than any of the legs 8—12.

In the embodiment of FIGS. 1—3, rotor 2 has 30 identical teeth 4 which extend radially outward from hub 5. FIG. 3 shows several teeth 20—24 enlarged. Each tooth has an elongated body portion 25 with parallel side edges 26 and 27, as shown at FIG. 3 for tooth 20. In addition, each tooth has an elongated end portion 28 which is offset at a slight angle to body portion 25 in the direction of rotation of rotor 2, which as shown at FIG. 3 is clockwise.

Along the body portion 25 of the teeth, corresponding portions of the teeth are approximately 12° apart from each other. The geometry of the ends 28 of the teeth is such that the width W of each tooth between leading edge 29 and trailing edge 30 is approximately one-half the distance between the leading edge of one tooth and the trailing edge of the next adjacent tooth. This relationship is shown at FIG. 3 where the width of tooth 24 is shown as W, and the distance between the leading edge 29 of tooth 23 and the trailing edge 30 of tooth 24 is 2W. It will be observed with reference to FIG. 3 that the width of pole face 13 as measured between side surfaces 32 and 33 of stator 7 is also equal to W, the width of an end portion 28 of a tooth.

The relationship between the width W of a tooth 23 and the width 3W between the leading edges 29 of successive teeth 22 and 23 defines magnetic working area ratio of 1:3 for the rotor teeth 4.

As shown in FIG. 1, side surface 33 of stator 7 is in a plane that passes through the axis of shaft 6. Hence, stator 7 has its centerline offset slightly from the center of shaft 6 in a direction opposite to the direction of rotation of rotor 2. The slight offset between end portion 28 and body 25 of each tooth is sufficient that as a tooth enters the airgap 15, its leading edge, such as edge 29 of tooth 22, is parallel with side surface 32 of the stator. This relationship assures that the magnetic forces acting on a tooth as the tooth enters airgap 15 will be perpendicular to the front edge of the tooth.

AC OPERATION OF MOTOR 1

Motor 1, described with reference to FIGS. 1—3, is particularly adapted to be operated from an AC power source. As shown at FIG. 1, energizing coil 17 is energized directly from a 120-volt, 60-cycle power source. FIG. 5 shows the sinusoidal current wave 36 of the AC source which energizes coil 17. The current in coil 17 induces magnetic flux in base leg 8 of stator 7 as shown at FIG. 5A, the magnetic flux 37 in base leg 8 generally following the current waveform of FIG 5. The induced flux tends to flow along legs 9 and 10. Shunt leg 16, as previously described, has a cross-sectional area substantially smaller than legs 9 and 10, and hence shunt leg 16 saturates when flux in this leg is at level substantially below the maximum level of the flux in legs 8, 9 and 10. However, so long as shunt leg 16 is not saturated, the reluctance at airgap 15 is many times greater than the reluctance of the shunt leg. Therefore, the magnetic flux seeking the path of least resistance, first saturates shunt leg 16, and not until the shunt leg is saturated does the flux induced in stator 7 appear at airgap 15.

In the motor of FIGS. 1—3, shunt leg 16 is so selected and arranged that it becomes saturated about 45° after the initiation of each half cycle of sinusoidal current in coil 17. As shown at FIG. 5B, shunt leg 16 saturates when its flux 38 reaches level 39. When shunt leg 16 saturates, its permeability decreases substantially and the magnetic flux induced in base leg 8 seeks the path of least resistance which then is through the magnetic circuit including base leg 8, side leg 9, end leg 11, airgap 15, end leg 12, and side leg 10. The flux in airgap 15 then increases quite rapidly to a peak value (at 90° of the energizing current 36), and decreases again to the near zero level at 135° of the sine wave half cycle. As shown at FIG. 5C, the airgap flux takes the form of a pulse 40. The reason for the decrease of airgap flux is that as the current in coil 17 decreases after its peak at 90°, a level of flux is reached at about 135° where shunt leg 16 is no longer saturated and hence the flux again seeking the path of least resistance flows through the shunt leg rather than the portion of the magnetic circuit of stator 7 including the airgap. During the negative half cycle of energizing current 36 (FIG. 5), shunt leg 16 saturates at about 225°, whereupon a flux pulse 41 (FIG. 5C) is produced at airgap 15. Pulse 41 terminates at about 315°. Hence, by virtue of shunt leg 16, the sinusoidal current from the powerline, which energizes coil 17, is transformed into positive and negative pulses of magnetic flux at the airgap, these pulses each having a time duration substantially less than the period of each half cycle of the sinusoidal energizing current.

Under optimum conditions, the duration of each flux pulse in airgap 15 should equal the time required for the tooth 22 to move from the position of FIG. 3 to a position where this tooth is centered in airgap 15. This would be the case if it were possible to obtain a rectangular pulse of magnetic flux in the airgap from the alternating current source. However, because such a square wave of flux cannot readily be obtained economically from the alternating current source, the flux pulse begins at 45° after the beginning of the positive half cycle of current 36, whereas tooth 22, for example, does not reach the position squarely at the entrance to airgap 15 until about 60° after the beginning of the half cycle of current 36, when there is sufficient magnetic flux at the airgap to pull tooth 22 into the airgap. When tooth 22 has reached a position where the tooth is centered in the airgap, the flux in the airgap has decreased to the value at 120°, and the momentum of rotor 2 readily carries the tooth from the airgap even though there is a slight retarding force from the magnetic flux in the gap at the time. Because of the time interval between the positive-going flux pulse 40 (FIG. 5C), and the negative-going pulse 41, tooth 22 will have advanced to a position just short of the position of tooth 23 (FIG. 3) and hence the negative-going flux pulse will have little if any attractive effect on this tooth. However, as the flux in airgap 15 again builds up, the next succeeding tooth moves to the position formerly occupied by tooth 22, at the entrance of the airgap, and is drawn into the airgap by the magnetic flux then present. Because of the approximately 50 percent duty cycle of the flux in airgap 15, output torque sufficient for clock purposes can be obtained from the motor of FIGS. 1—3, even when this motor is of a very small size. Because of the offset in end portion 28 of each tooth, the trailing edge 30 of a receding tooth is spaced a substantial distance from the airgap before the next pulse of magnetic flux appears at the airgap, and this feature further lessens the retarding force of the stator on a receding tooth.

As previously explained, motor 1 has 30 teeth. In addition, each tooth has a width W, and the space between adjacent teeth is 2W. Therefore, the angular distance between corresponding portions of adjacent teeth is 12°, and each tooth measures an angular distance of 4°. Since the width of airgap 15, and correspondingly the width of pole faces 13 and 14, is equal to the width W of a tooth, the tooth 22 travels 4 angular degrees in moving from the position of FIG. 3 to a position fully within airgap 15. The tooth then coasts for approximately 8 angular degrees until the next tooth is in position squarely at the entrance to airgap 15. Where the sinusoidal energizing current for coil 17 is the standard 120-volt, 60-cycle current, one tooth is drawn into the airgap during each positive-going half cycle of the alternating current, and one tooth is drawn into the airgap during each negative-going half cycle of the alternating current. Hence, the 60-cycle current, by virtue of the action of shunt leg 16, provides 120 flux pulses per second. Because there are 30 teeth, the 120 pulses per second cause the rotor to rotate at 4 revolutions per second or 240 revolutions per minute.

THE MOTOR OF FIG. 4

Figure 4:
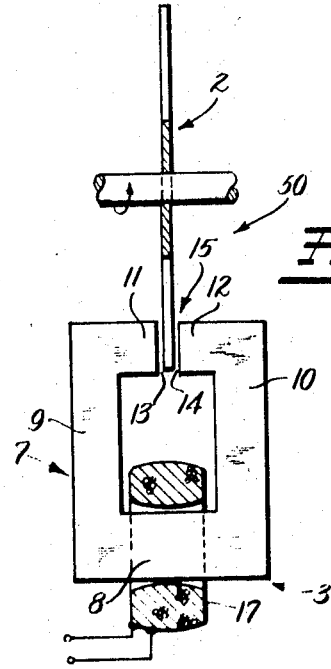
FIG. 4 is a front elevational view of a second embodiment of the motor system of this invention.

Another embodiment includes the motor 50 shown at FIG. 4. Motor 50 is identical to motor 1, previously described with reference to FIGS. 1—3, except that shunt leg 16 is eliminated. Stator 7 has a base leg 8, parallel side legs 9 and 10, and legs 11 and 12, and pole faces 13 and 14 which cooperate to define the airgap 15 of the motor. Rotor 2 is identical to that previously described in FIGS. 1—3.

OPERATION OF MOTOR 50

If motor 50 were connected directly to a sine wave power source, the flux in airgap 15 would have a waveform similar to that of flux 37 at FIG. 5A. The motor would not provide any appreciable usable torque because of the substantial retarding force exerted on a rotor tooth during, for example, the trailing 60° of each sine wave half cycle. Hence, while substantial torque would be exerted on a tooth such as the tooth 22 when it is at the entrance of airgap 15 (FIG. 3), there would correspondingly be substantial retarding torque tending to stop the tooth when it is fully within airgap 15. To avoid this disadvantage, motor 50 is energized from a pulse source which provides current pulses of a selected duty cycle to drive the rotor. As is the case with the motor 1, the pulses may be alternately positive going and negative going, or may all be of the same polarity. The significant factor is, however, that the pulses must have a duty cycle selected so that no significant retarding force is exerted on a tooth as it departs from the airgap.

One energizing circuit for the motor of FIG. 4 which permits operation of the motor from a 120-volt, 60-cycle supply is shown at FIG. 6. This arrangement is simple and includes a rectifier diode 51 in series with energizing coil 17. As shown at FIG. 7, the power source has a sinusoidal current waveform 52. The action rectifier diode 51 is to eliminate the negative-going half cycles of the sinusoidal current. Coil 17 is energized only with positive current pulses 53, 54 and magnetic flux pulses 55, 56, spaced apart in time, are induced in airgap 15 (FIG. 7B). The current pulses 53 and 54 and the flux pulses 55 and 56 induced in airgap 15 have a duration of 180°, whereas to completely eliminate a retarding force on a departing tooth the duration of the flux pulse should be only 120° for a toothed rotor having a magnetic working area ratio of 1:3. However, the retarding of each half cycle is nominal because the first and last 30° of each half cycle of an alternating current sine wave can each contribute only 6 percent of the total power in each half cycle. Hence, since the first and last 30° of each half cycle provide only nominal flux in the airgap, the circuit arrangement of FIG. 6 provides for energizing motor 50 at a substantially ideal condition where there is very little retarding force on a tooth as it leaves the airgap 15. It will be appreciated, however, that the alternating current 52, when half wave rectified, provides only 60 pulses per second. Hence, when rotor 2 having 30 teeth is used, the rate of rotation of the rotor is 2 revolutions per second or 120 revolutions per minute.

FIG. 8 shows the optimum energizing current waveform for motor 50. The current pulses supplied to the energizing coil 17 are of rectangular shape, each lasting for a time interval T, the time interval between pulses being 2T. This represents a true one-third duty cycle. Note that this one-third duty cycle corresponds to the magnetic working area ratio of 1:3 for the rotor of FIG. 1.

When motor 50 is energized with the rectangular current waveform of FIG. 8, flux pulses 57, 58, 59, (FIG. 8A) are induced in airgap 15. The time required for tooth 22 to travel from the position of FIG. 3 to a position where it is fully centered in the airgap 15 is equal to the time interval T of each pulse. There then is a time interval 2T during which tooth 22 moves to the position shown for tooth 23 at FIG. 3. During this time interval, there is no flux present in the airgap, and hence there is no retarding force on the departing tooth. The next energizing pulse induces a magnetic flux pulse in airgap 15 as the next approaching tooth is squarely at the entrance to the airgap. This cycle is repeated, and optimum operation is obtained because the magnetic flux at the airgap decreases to zero when a tooth of the rotor reaches the position where it is centered in the airgap. Because of the absence of any retarding forces on a tooth departing the airgap, substantial torque can be obtained from even a very small motor of the construction shown at FIG. 4.

Where the motor of FIG. 4 is used to drive a clock or other timing device, the rotor must rotate at a precise constant speed. Since the speed of rotation is completely dependent on the frequency of the current pulse source for energizing coil 17, the speed of the motor and its accuracy is wholly dependent on a constant frequency pulse source. This assumes, of course, that the magnetic working area ratio of the rotor teeth 4 is approximately the same as the current pulse duty cycle.

FIG. 9 shows an oscillator for providing current pulses of a constant frequency to energize motor 50.

The circuit shown includes an NPN switching transistor 60 having its collector in series with a tuning fork drive coil 61 adjacent to a tuning fork 62. The positive terminal of a direct current power supply is connected to the upper end of drive coil 61. A bias resistor 63' connects between the collector and base of the transistor. A circuit including a capacitor 63 in parallel with a tuning fork pickup coil 64 to form a tuned circuit, and a blocking capacitor 65 in series with the tank circuit, is connected between the base of transistor 60 and the positive terminal of the power source. The output of the tuning fork oscillator is taken across the tuning fork drive coil at output terminals 66 and 67.

The frequency of the oscillator of FIG. 9 is accurately controlled by tuning fork 62. Initially, when current flows through bias resistor 63', transistor 60 becomes conductive and current flows through coil 61 so that at least one tine of tuning fork 62 is pulled toward the coil. A signal is regeneratively coupled to pickup coil 64 to drive the transistor into the fully conductive state. When the direction of the tuning fork tine reverses, the polarity of the signal in pickup coil 64 also reverses and renders transistor 60 nonconductive. Transistor 60 turns on and off in synchronism with the tuning fork movement and produces an output signal across terminals 66 and 67 at the tuning fork frequency.

By properly selecting the various circuit components of the oscillator of FIG. 9, transistor 60 is switched on for a time interval during which coil 17 of the motor is energized, yet remains off for a longer time interval before it is again switched on. Due to the inductance in the circuit, it is not possible to achieve a square current pulse through the motor coil, but the circuit is designed to come as close as possible to the current waveform shown in FIG. 8 wherein the on-time is T and the off-time is 2T so that the waveform has a duty cycle of 1:3.

As indicated in FIG. 10, connecting terminals 68 and 69 of coil 17 can be connected directly to terminals 66 and 67, respectively, of the oscillator of FIG. 9 but in some cases may cause loading or spurious triggering of the oscillator with the result that the frequency of oscillation is not precisely maintained. To avoid such loading with corresponding undesired variations of frequency, coil 17 may be connected to the oscillator of FIG. 9 using the circuit arrangements of FIGS. 11—14.

As shown at FIG. 11, a diode 70' is connected in series with energizing coil 17 so its cathode is connected to terminal 67 of the oscillator of FIG. 9 when the terminals 70, 71 are connected respectively to terminals 66 and 67 of the oscillator. The diode 70', while permitting a positive current pulse to flow from terminal 66, through coil 17 to terminal 67, blocks the inductive surge from coil 17 when the coil is deenergized. Such blocking by diode 70' prevents spurious currents from triggering transistor 60.

Another inductive surge preventing circuit is shown at FIG. 12. Here, diode 73 is connected in shunt across energizing coil 17. During the normal positive current pulse from terminal 74, through coil 17 to terminal 75, diode 73 is nonconducting. However, when the energizing pulse terminates, the inductive surge from coil 17 is prevented by conduction of diode 73 and again spurious signals are not transmitted to the oscillator from the motor coil 17.

In the circuit of FIG. 13, a capacitor 76 is connected in shunt across energizing coil 17. When the energizing pulse to coil 17 terminates, the inductive surge from the coil dissipates itself through capacitor 76.

A somewhat more sophisticated circuit arrangement to prevent interaction between the coils of the oscillator of FIG. 9 is shown at FIG. 14. Here, a second NPN transistor 77 has its collector-emitter circuit in series with coil 17. In addition, a base-biasing resistor 78 is connected from the base of transistor 77 to upper end of energizing coil 17.

When the terminals 79 and 80 of the circuit of FIG. 14 are connected across terminals 66 and 67 of the oscillator of FIG. 9, and the oscillator is set into operation, there is substantially no interaction with coil 17. A current pulse from the oscillator across terminals 79 and 80 switches transistor 77 on and energizes coil 17. As soon as the pulse terminates, the base bias for transistor 77 is removed and there is no interaction between coil 77 and coil 61 through the now nonconducting transistor 77.

While several preferred embodiments of a motor system driven in a unique manner by periodic flux pulses have been shown and described, it is within the contemplated scope of this invention that numerous changes can be made in the preferred embodiments discussed above without departing from the scope of this invention. For example, the shunt leg 16 described with reference to FIGS. 1 and 2, while shown as an integral part of the stator 7, can take the form of a separate element of magnetic material of any desired composition to provide the necessary magnetic characteristics for proper performance of the shunting function. In addition, numerous other changes can be made in the power supplies and the arrangements shown and described herein without departing from the intended scope of this invention as herein described and as more particularly defined in the appended claims.

I claim:

1. A synchronous motor system including:
   a stator of magnetic material providing at least a pair of opposed pole faces with an airgap therebetween;
   a rotor having a plurality of teeth of magnetic material adapted to rotate through said airgap;
   means for producing individual magnetic flux pulses, having a selected duty cycle significantly less than unity in said airgap;
   said flux pulses drawing successive ones of said teeth into said airgap to drive said motor.

2. A motor system according to claim 1 wherein the magnetic working area ratio of said rotor is substantially the same as said flux pulse duty cycle.

3. A synchronous motor according to claim 1, wherein:
   said teeth are radially extending for rotation through the airgap about an axis of rotation generally parallel to a line joining the pole faces.

4. A synchronous motor as set forth in claim 3, wherein the rotor teeth extend radially outwardly from a hub and have their peripheral ends offset in the direction of rotation at an angle to a radius of the rotor thereat.

5. A synchronous motor as called for in claim 4, wherein the pole faces are elongated in a direction generally normal to the direction of movement of rotor teeth through the airgap.

6. A synchronous motor as defined in claim 3, wherein the pole faces are elongated in a direction generally normal to the direction of movement of rotor teeth through the airgap and the axis of the peripheral end of each rotor tooth in said airgap forms an angle with said direction of elongation of the pole face.

7. A synchronous motor according to claim 6, wherein the peripheral end of each tooth immediately prior to entering the airgap is generally parallel to the elongated pole face.

8. A synchronous motor system including:
   a stator of magnetic material providing at least a pair of opposed pole faces with an airgap therebetween;
   a stator winding magnetically coupled to said stator;
   a rotor having a plurality of teeth of magnetic material adapted to rotate through said airgap;
   means for energizing said stator winding with successive current pulses at a selected current pulse duty cycle said current pulses establishing successive individual flux pulses in said airgap having a duty cycle significantly less than unity;
   said flux pulses drawing successive ones of said teeth into said airgap to drive said motor.

9. A motor system according to claim 8 wherein the magnetic working area ratio of said rotor is substantially the same as said current pulse duty cycle.

10. A motor system according to claim 8 wherein said means for energizing said stator winding includes:
    a source of electrical power;
    means coupled between said source of power and said stator winding for converting said source power into successive current pulses.

11. A motor system according to claim 10 wherein said source power is sinusoidal and said means for converting said source power into successive current pulses includes rectifier means.

12. A motor system according to claim 11 wherein the distance between adjacent teeth is at least two times the width of a single tooth.

13. A synchronous motor system as set forth in claim 10, wherein:
    said converting means comprises electronic switching means connected in circuit with the stator winding.

14. A synchronous motor system as defined in claim 13, wherein:
    said electronic switching means includes a pair of electrodes in series circuit with the stator winding and a control electrode responsive to said source of electrical power for periodically rendering the series circuit conductive between said electrode pair.

15. A synchronous motor system as claimed in claim 14, wherein:
    said source of electrical power includes electromechanical timing means electrically coupled to said switching means for establishing a frequency of oscillation of said source.

16. A synchronous motor system including:
    a stator of magnetic material providing at least a pair of opposed pole faces with an airgap therebetween;
    a rotor having a plurality of teeth of magnetic material adapted to rotate through said airgap;
    means for producing magnetic flux pulses in said airgap;
    said means including a source of current cyclically variable in amplitude and establishing a current cycle, and saturable magnetic shunt means affixed to said stator and parallel to said pole faces to divert a portion of the flux in said stator from said airgap during a significant portion of the current cycle, thereby to provide time-displaced flux pulses at the airgap constituting a flux duty cycle significantly less than unity;
    said flux pulses drawing successive ones of said teeth into said airgap to drive said motor.

17. A synchronous motor system as defined in claim 16, wherein:
    the shunt is operable to make the duty cycle of flux through the shunt means is greater than the duty cycle of flux at the airgap.

18. A synchronous motor system including:
    a stator of magnetic material, said stator including a base leg;
    a pair of parallel side legs, and end legs projecting inwardly toward each other from said side legs to form an airgap therebetween;
    a stator winding magnetically coupled to said stator;
    a rotor having a plurality of teeth of magnetic material adapted to rotate through said airgap;
    means for energizing said stator winding with a source of current cyclically variable in amplitude and establishing a current cycle;
    means for producing magnetic flux pulses in said airgap;

said means including saturable magnetic shunt means disposed between said side legs of said stator to divert a portion of the flux in said stator from said airgap during a significant portion of the current cycle thereby to provide individual flux pulses at the airgap having a duty cycle significantly less than unity, said flux pulses drawing successive ones of said teeth into said airgap to drive said motor.

19. A motor system according to claim 18 wherein the cross-sectional area of said magnetic shunt means is substantially less than the cross-sectional area of said stator legs.

20. A motor system according to claim 18 wherein said means for energizing said stator winding includes a source of sinusoidal current connected to said stator winding.

21. A motor system according to claim 18 wherein:
said magnetic shunt means saturates before the flux in said stator reaches its maximum value but after the flux in said stator reaches a significant portion of such maximum value.

22. A motor system according to claim 18 wherein:
the magnetic working area ratio of said rotor teeth is approximately 1:3; and
the duty cycle of said magnetic flux pulses is approximately 1:2.